(12) United States Patent
Wang et al.

(10) Patent No.: US 11,119,181 B2
(45) Date of Patent: *Sep. 14, 2021

(54) DIRECTION FINDING ANTENNA FORMAT

(71) Applicant: MEDIATEK INC., Hsinchu (TW)

(72) Inventors: James June-Ming Wang, San Marino, CA (US); Kai-Chun Chou, Taipei (TW); Ching-Hwa Yu, Tainan (TW); Hsuan-Yu Liu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 98 days.

This patent is subject to a terminal disclaimer.

(21) Appl. No.: 16/452,387

(22) Filed: Jun. 25, 2019

(65) Prior Publication Data
US 2019/0310341 A1  Oct. 10, 2019

Related U.S. Application Data

(63) Continuation of application No. 14/828,679, filed on Aug. 18, 2015, now Pat. No. 10,371,783.
(Continued)

(51) Int. Cl.
*G01S 5/02* (2010.01)
*G01S 3/74* (2006.01)
(Continued)

(52) U.S. Cl.
CPC .................. *G01S 3/74* (2013.01); *G01S 3/02* (2013.01); *G01S 3/043* (2013.01); *G01S 5/02* (2013.01);
(Continued)

(58) Field of Classification Search
CPC ... G01S 3/46; G01S 3/043; G01S 3/74; G01S 3/14; G01S 3/42; G01S 3/02; G01S 1/02;
(Continued)

(56) References Cited

U.S. PATENT DOCUMENTS 6,839,025 B1   1/2005 Reigle
7,126,533 B2  10/2006 Fiore et al.
(Continued)

FOREIGN PATENT DOCUMENTS

CN    102149192    8/2011
CN    105939186    9/2016
(Continued)

OTHER PUBLICATIONS

Robert Stacey, Intel, Specification Frame Work for TGAX, IEEE P802.11 Wireless LANs, Jul. 2015 *p. 3, Line 23-39*, *p. 4, Line 1-5*, *Sections 3.2.2, 3.2.3, 3.3.2, 4.1*.
(Continued)

*Primary Examiner* — Chuong P Ngyuen

(57) ABSTRACT

A method of direction finding (DF) positioning based on a simplified antenna platform format in a wireless communication network is proposed. A receiver receives antenna platform format information of a transmitter having multiple antenna elements. The antenna platform format information comprises an antenna platform format indicator, antenna platform position and orientation information, a number of antenna elements, and switching delay, phase center, and polarization information for each antenna element. The receiver receives a plurality of direction finding sounding signals transmitted from the transmitter via the multiple antenna elements. The receiver performs a DF algorithm based on the plurality of DF sounding signals and the antenna platform format information and thereby estimating a DF solution. Finally, the receiver determines its own location information based on the estimated DF solution.

20 Claims, 6 Drawing Sheets

Related U.S. Application Data

(60) Provisional application No. 62/038,466, filed on Aug. 18, 2014.

(51) Int. Cl.

| | | |
|---|---|---|
| *G01S 3/04* | (2006.01) | |
| *G01S 3/02* | (2006.01) | |
| G01S 3/46 | (2006.01) | |
| G01S 3/42 | (2006.01) | |
| G01S 3/14 | (2006.01) | |
| G01S 1/08 | (2006.01) | |
| G01S 1/04 | (2006.01) | |
| G01S 5/12 | (2006.01) | |

(52) U.S. Cl.
CPC ........... *G01S 5/0284* (2013.01); *G01S 1/0428* (2019.08); *G01S 1/08* (2013.01); *G01S 3/14* (2013.01); *G01S 3/42* (2013.01); *G01S 3/46* (2013.01); *G01S 5/0247* (2013.01); *G01S 5/12* (2013.01)

(58) Field of Classification Search
CPC .......... G01S 1/0428; G01S 1/042; G01S 1/08; G01S 5/02; G01S 5/0284
USPC ........................................ 342/417, 423, 442
See application file for complete search history.

(56) References Cited

U.S. PATENT DOCUMENTS

| | | | |
|---|---|---|---|
| 8,213,527 B2 | 7/2012 | Wang et al. | |
| 8,619,641 B2 | 12/2013 | Guo | |
| 8,879,993 B2* | 11/2014 | Palin | G01S 5/0072 455/41.2 |
| 8,929,192 B2* | 1/2015 | Kainulainen | G01S 1/08 370/203 |
| 8,965,284 B2* | 2/2015 | Honkanen | G01S 3/46 455/41.2 |
| 9,231,809 B2 | 1/2016 | Azizi et al. | |
| 9,331,883 B1 | 5/2016 | Schelstraete et al. | |
| 9,615,214 B2 | 4/2017 | Syrjarinne et al. | |
| 9,647,868 B2 | 5/2017 | Jiao et al. | |
| 9,739,878 B2 | 8/2017 | Gudim et al. | |
| 10,048,349 B2* | 8/2018 | Wang | G01S 3/46 |
| 10,142,778 B2* | 11/2018 | Banerjea | H04B 7/0805 |
| 10,206,122 B2* | 2/2019 | Wang | H04W 64/00 |
| 10,371,783 B2* | 8/2019 | Wang | G01S 5/0284 |
| 10,560,917 B2* | 2/2020 | Kasher | H04W 72/048 |
| 10,859,689 B2* | 12/2020 | Knaappila | G01S 5/0284 |
| 2001/0006540 A1 | 7/2001 | Kim et al. | |
| 2006/0158374 A1 | 7/2006 | Rahamin et al. | |
| 2008/0191941 A1 | 8/2008 | Saban et al. | |
| 2008/0232485 A1 | 9/2008 | Niu et al. | |
| 2009/0122890 A1 | 5/2009 | Wu | |
| 2010/0246720 A1 | 9/2010 | Wang et al. | |
| 2011/0033004 A1 | 2/2011 | Wang et al. | |
| 2011/0193739 A1 | 8/2011 | Strauch et al. | |
| 2011/0243197 A1 | 10/2011 | Atarashi et al. | |
| 2011/0261858 A1 | 10/2011 | Baldemair et al. | |
| 2011/0274003 A1 | 11/2011 | Pare, Jr. et al. | |
| 2012/0256726 A1 | 10/2012 | Honkanen et al. | |
| 2012/0258669 A1 | 10/2012 | Honkanen et al. | |
| 2012/0263211 A1 | 10/2012 | Porat et al. | |
| 2013/0039200 A1 | 2/2013 | Park et al. | |
| 2013/0070701 A1 | 3/2013 | Merlin et al. | |
| 2013/0089121 A1 | 4/2013 | Koo et al. | |
| 2013/0136016 A1 | 5/2013 | Lee et al. | |
| 2013/0265907 A1 | 10/2013 | Kim et al. | |
| 2013/0321209 A1 | 12/2013 | Kalliola et al. | |
| 2013/0343211 A1 | 12/2013 | Liu et al. | |
| 2014/0070996 A1* | 3/2014 | Kneckt | G01S 1/08 342/386 |
| 2014/0219449 A1 | 8/2014 | Shattil et al. | |
| 2014/0254648 A1 | 9/2014 | Van Nee | |
| 2014/0293983 A1 | 10/2014 | Amiri et al. | |
| 2014/0328335 A1 | 11/2014 | Zhang | |
| 2015/0009894 A1 | 1/2015 | Vermani et al. | |
| 2015/0023449 A1 | 1/2015 | Porat et al. | |
| 2015/0124739 A1 | 5/2015 | Baik et al. | |
| 2015/0139091 A1 | 5/2015 | Azizi et al. | |
| 2015/0139115 A1 | 5/2015 | Seok | |
| 2015/0230231 A1 | 8/2015 | Fornoles, Jr. | |
| 2015/0296516 A1 | 10/2015 | Jung | |
| 2015/0333885 A1 | 11/2015 | Athley | |
| 2016/0014763 A1 | 1/2016 | Jauh et al. | |
| 2016/0021568 A1 | 1/2016 | Yu et al. | |
| 2016/0033614 A1 | 2/2016 | Wang et al. | |
| 2016/0047885 A1 | 2/2016 | Wang et al. | |
| 2016/0065467 A1 | 3/2016 | Wu et al. | |
| 2016/0174200 A1 | 6/2016 | Seok | |
| 2016/0248542 A1 | 8/2016 | Liu et al. | |
| 2016/0249165 A1 | 8/2016 | Aldana | |
| 2016/0323060 A1 | 11/2016 | Hassanin et al. | |
| 2016/0330055 A1 | 11/2016 | Tong | |
| 2016/0352552 A1 | 12/2016 | Liu et al. | |
| 2016/0366548 A1 | 12/2016 | Wang et al. | |
| 2016/0370450 A1 | 12/2016 | Thorn et al. | |
| 2017/0048862 A1 | 2/2017 | Choi et al. | |
| 2017/0064718 A1 | 3/2017 | Bharadwaj et al. | |
| 2017/0070893 A1 | 3/2017 | Wang et al. | |
| 2017/0070998 A1 | 3/2017 | Wu et al. | |
| 2017/0093546 A1 | 3/2017 | Wu et al. | |
| 2017/0099089 A1 | 4/2017 | Liu et al. | |
| 2017/0104553 A1 | 4/2017 | Liu et al. | |
| 2017/0134207 A1 | 5/2017 | Liu et al. | |
| 2017/0171363 A1 | 6/2017 | Sun et al. | |
| 2017/0171796 A1 | 6/2017 | Wu et al. | |
| 2017/0180177 A1 | 6/2017 | Wu et al. | |
| 2017/0181136 A1 | 6/2017 | Bharadwaj et al. | |
| 2017/0214507 A1 | 7/2017 | Kang et al. | |
| 2017/0215087 A1 | 7/2017 | Amizur et al. | |
| 2017/0230220 A1 | 8/2017 | Anwyl et al. | |
| 2017/0230981 A1 | 8/2017 | Ryu et al. | |
| 2018/0013527 A1 | 1/2018 | Sun et al. | |

FOREIGN PATENT DOCUMENTS

| | | |
|---|---|---|
| EP | 3098999 | 11/2016 |
| TW | 201618501 | 5/2016 |
| WO | 2004/049498 A1 | 6/2004 |
| WO | 2004049498 | 6/2004 |
| WO | 2010/022785 A1 | 3/2010 |
| WO | 2010022785 | 3/2010 |
| WO | 2014/027941 A1 | 2/2014 |
| WO | 2015069811 | 5/2015 |
| WO | 2015077042 | 5/2015 |
| WO | 2016126034 | 8/2016 |
| WO | 2016178534 | 11/2016 |
| WO | 2017003229 | 1/2017 |
| WO | 2017027479 | 2/2017 |
| WO | 2017035235 | 3/2017 |

OTHER PUBLICATIONS

Darryn Lowe et al., "Analysis and Evaluation of MB-OFDM Dual Carrier Modulation", Telecommunications Information Technology Research Institute, University of Wollongong.

EPO, Search Report for the EP Patent Application 16187569.5 dated Nov. 9, 2017(6 Pages).

EPO, Search Report for the EP Patent Application 16191047.6 dated Feb. 14, 2017 (7 Pages).

Young Hoon Kwon, Newracom, SIG field Design Principle for 11AZ, Doc.: IEEE 802.11-15-0344R2, Mar. 2015 *Slides 5-14*.

EPO, Search Report for the EP Patent Application 16193438.5 dated Mar. 17, 2017 (9 Pages).

EPO, Search Report for the EP Patent Application 16197315.1 dated Mar. 31, 2017 (8 Pages).

Tim Schmidt, "Clause 6 OFDM PHY Draft", Jan. 2010 IEEE P802. 15-10-0013-00-004G, IEEE P802.15 Wireless Personal Area Networks, Progect IEEE P802.15 Working Group for Wireless Personal Area Networks (WPANS).

(56) References Cited

OTHER PUBLICATIONS

Robert Stacey, Intel, Specification Framework for TGAX, IEEE P802.11 Wireless LANs, Doc: IEEE 802.11-15/0132R8, Sep. 2015. *Paragraph [3.2.4]*.
Joonsuk Kim, Apple, HE-SIG-B Structure, Doc.: IEEE 802.11-15/0821R2, Jul. 2015 *Slides 8-15*.
Joonsuk Kim, et al., HE-SIG-B Structure, Doc.: IEEE 802.11-15/0821R2, Sep. 2015 *Slides 11-15*.
Katsuo Yunoki, KDDI R&D Laboratories, Considerations on HE-SIG-A/B, Doc.: IEEE 802.11-15/827R2, Jul. 2015 *Slides 2-11*.
Kaushik Jostam et al., HE-SIG-B Contents, Doc.: IEEE802.11-15/1066R0, Sep. 2015, *Slide 8* *Slides 10, 11* *Slide 17*.
M. Rahaim et al., WIFE PHY Standards Review—From Early 802.11 to 'AC' and 'AD', MCL Technical Report No. 04-29-2014.
EPO, Search Report for the EP Patent Application 15833049.8 dated Feb. 16, 2018 (9 Pages).
International Search Report and Written Opinion of International Search Authority for PCT/CN2015/087365 dated Nov. 24, 2015 (10 Pages).

* cited by examiner

AoD POSITIONING FOR BlueTooth

Antenna Platform Format Indicator 901     Size: 1 Bit

| Value | Parameter Description |
|---|---|
| 0x0 | DEFAULT ANTENNA PLATFORM FORMAT |
| 0x1 | SIMPLIFIED ANTENNA PLATFORM FORMAT |

Antenna Platform Position/Orientation 902     Size: 6 Octets

| Value | Parameter Description |
|---|---|
| 0xXXXXXXXXXXXX | X, Y, and Z COORDINATE OF ANTENNA POSITION IN LOCAL ANTENNA PLATFORM COORDINATE SYSTEM, IN mm |
| 0xXXXXXXXXXXXX | α, β and γ COORDINATE OF ANTENNA ORIENTATION, IN DEGREE |

Switching Delay 903     Size: 1xn Octets

| Value | Parameter Description |
|---|---|
| 0xXXXXXXXXXXXX | SWITCH PROPAGATION DELAY DIFFERENCE IN 0.03ns |

Antenna Position (Phase Center): 904     Size: 3xn Octets

| Value | Parameter Description |
|---|---|
| 0xXXXXXXXXXXXX | X COORDINATE OF ANTENNA POSITION IN LOCAL ANTENNA PLATFORM COORDINATE SYSTEM, IN mm |
| 0xXXXXXXXXXXXX | Y COORDINATE OF ANTENNA POSITION IN LOCAL ANTENNA PLATFORM COORDINATE SYSTEM, IN mm |
| 0xXXXXXXXXXXXX | Z COORDINATE OF ANTENNA POSITION IN LOCAL ANTENNA PLATFORM COORDINATE SYSTEM, IN mm |

Antenna Polarization Type: 905     Size: 2xn Bits

| Value | Parameter Description |
|---|---|
| 0x00 | LINEAR POLARIZATION |
| 0x01 | CIRCULAR POLARIZATION |
| 0x10 | MIXED |
| 0x11 | RESERVED |

Polarization Orientation: 906     Size: 3xn Octets

| Value | Parameter Description |
|---|---|
| 0xXXXXXXXXXXXX | 3D ORIENTATION OF THE ANTENNA IN LOCAL ANTENNA PLATFORM COORDINATE SYSTEM, ALPHA |
| 0xXXXXXXXXXXXX | 3D ORIENTATION OF THE ANTENNA IN LOCAL ANTENNA PLATFORM COORDINATE SYSTEM, BETA |
| 0xXXXXXXXXXXXX | 3D ORIENTATION OF THE ANTENNA IN LOCAL ANTENNA PLATFORM COORDINATE SYSTEM, GAMMA |

FIG. 9

DIRECTION FINDING ANTENNA FORMAT

CROSS REFERENCE TO RELATED APPLICATIONS

This application is a Continuation of and claims priority to commonly assigned, copending U.S. application Ser. No. 14/828,679, filed on Aug. 18, 2015, DIRECTION FINDING ANTENNA FORMAT, by James June-Ming Wang, et al., which is incorporated herein in its entirety.

TECHNICAL FIELD

The disclosed embodiments relate generally to wireless communications system, and, more particularly, to direction finding with antenna platform format information in wireless local area networks.

BACKGROUND

IEEE 802.11 is a set of media access control (MAC) and physical layer (PHY) specification for implementing wireless local area network (WLAN) communication, in the unlicensed (2.4, 5, and 60 GHz) frequency bands. Alternatively, Bluetooth is a set of media access control (MAC) and physical layer (PHY) specification for implementing personal area network (PAN) or point to point (P2P) communication, in the unlicensed (2.4) frequency band. The standards and amendments provide the basis for wireless network products using the IEEE 802.11 and Bluetooth frequency bands. IEEE 802.11 and Bluetooth plays an important role in the growing application of Indoor/Outdoor positioning. Direction fining (DF) positioning is achieved from either Angle of Departure (AoD) or Angle or Arrival (AoA). In AoD, the transmitter transmits through multiple antennas and the receiver (tracker) resolves the angle of departure relative to the antenna platform of the transmitter based on the received signals. In AoA, the receiver (tracker) employs multiple antennas to receive signal and resolves angle of arrival relative to its own antenna platform orientation. In both AoD and AoA, only one device with multiple antennas or antenna elements is needed, and only one-way signal transmission is required.

Multiple antenna elements on an antenna platform can be used to estimate AoA or AoD based on the phase difference and signal strength observed from the received signal at the multiple antenna elements or signals received from the multiple antenna elements. In the antenna array based DF system, the array response of all directions, which are often measured in chamber, needs to be pre-known. For example, the current Indoor Positioning Service 1.1 (high accuracy indoor positioning) requires transferring of antenna pattern database from the transmitter to the tracker (e.g., the Bluetooth (BLE) device). The volume of the database is 2 M bytes, which results in high transmission overhead and increase device storage size. Even after compression, the volume of the database is still quite large (~50 kbytes). The database is used by the receiver to correlate with the signal samples and obtain the AoA and AoD information.

Based on signal model, the BLE location can be solved using conventional AoD algorithms if the antenna platform information is known. Therefore, it is desirable to have an alternate simplified antenna platform format to enable the use of conventional AoD algorithms such as Bartlett beamformer, MUSIC, etc.

SUMMARY

A method of direction finding (DF) positioning based on a simplified antenna platform format in a wireless communication network is proposed.

In one embodiment, a receiving device receives antenna platform format information of a transmitting device having multiple antenna elements. The antenna platform format information comprises an antenna platform format indicator, antenna platform position and orientation information, a number of antenna elements, and switching delay, phase center, and polarization information for each antenna element. The receiving device receives a plurality of direction finding sounding signals transmitted from the transmitting device via the multiple antenna elements. The receiving device then performs a DF algorithm based on the plurality of DF sounding signals and the antenna platform format information and thereby estimating a DF solution. Finally, the receiving device determines its own location information based on the estimated DF solution. Because the simplified antenna platform format information does not include the antenna spatial signature or the antenna array response database, as a result, it reduces the overhead for data transmission and storage for the DF positioning method.

Other embodiments and advantages are described in the detailed description below. This summary does not purport to define the invention. The invention is defined by the claims.

BRIEF DESCRIPTION OF THE DRAWINGS

FIG. 9 illustrates one embodiment of providing simplified antenna platform format information for AoD positioning.

DETAILED DESCRIPTION

Reference will now be made in detail to some embodiments of the invention, examples of which are illustrated in the accompanying drawings.

Figure 1:
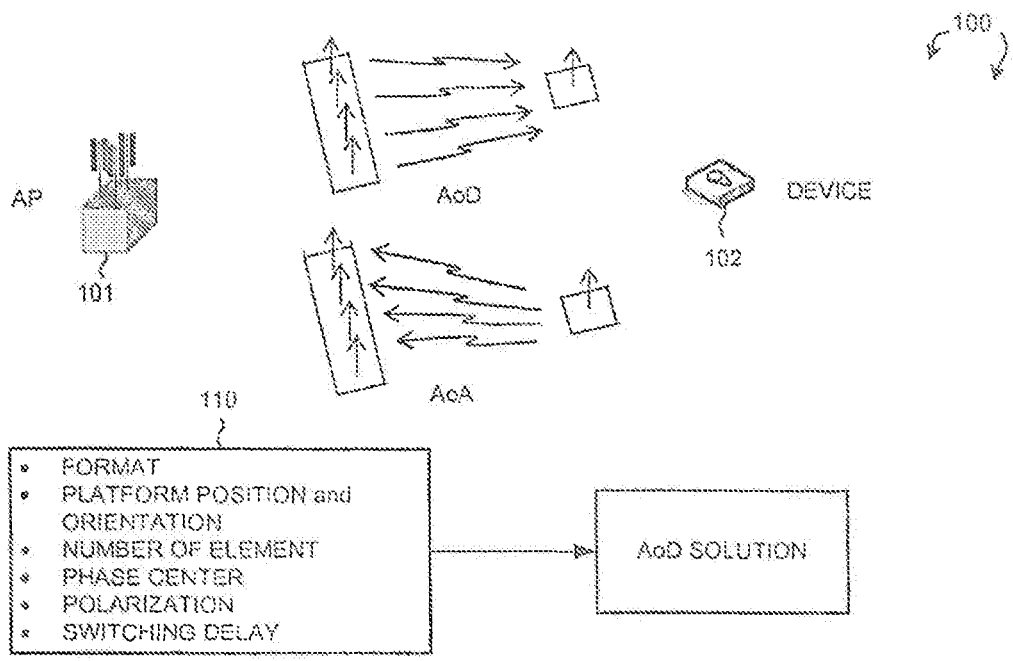
FIG. 1 illustrates a wireless local area network with direction finding positioning in accordance with one novel aspect.

FIG. 1 illustrates a wireless local area network (WLAN) 100 with direction finding (DF) positioning in accordance with one novel aspect. WLAN 100 comprises a wireless transmitting device AP 101 with multiple antennas or antenna elements and a wireless receiving device 102. In order for wireless device 102 to know its own location, direction finding positioning mechanism can be applied. Direction fining positioning is achieved from either Angle of Departure (AoD) or Angle or Arrival (AoA). In AoD, the transmitter (target) transmits through multiple antennas and the receiver (tracker) resolves the angle of departure relative to the antenna platform of the transmitter based on the received signals. In AoA, the receiver (tracker) employs multiple antennas to receive signal and resolves angle of arrival relative to its own antenna platform orientation. In both AoD and AoA, only one device with multiple antennas is needed, and only one-way signal transmission is required.

In the example of FIG. 1, in AoD, AP 101 is the transmitter (target) that transmits through multiple antennas and the receiver device 102 (tracker) resolves AoD relative to the antenna platform of the target, based on the received signals. Device 102 is then able to determine its location based on the AoD and the AP location, the AP antenna platform orientation information, each antenna position on the platform, and/or each antenna spatial signature. For those well versed in the art, the antenna spatial signature is the signal characteristics associated with different AoD directions, typically, generated by a certain arrangement of antenna polarizations and patterns on the antenna platform.

Multiple antenna elements on an antenna platform can be used to estimate AoA or AoD based on the phase difference and signal strength observed from the received signal at the multiple antenna elements or signals received from the multiple antenna elements. In the antenna array based DF system, the antenna array response of all directions, which are often measured in chamber, needs to be pre-known. For example, the current Indoor Positioning Service 1.1 (high accuracy indoor positioning) requires transferring of antenna pattern database from the target to the tracker. The volume of the database is 2 M bytes, which results in high transmission overhead and increase device storage size. Even after compression, the volume of the database is still quite large (~50 k bytes).

In accordance with one novel aspect, AP 101 provides a simplified antenna platform format information to device 102 for DF positioning. As depicted by box 110, the simplified antenna platform format information comprises an AP antenna platform format indicator indicating the default format or the simplified format, the AP location and the AP antenna platform orientation information, the number of antenna elements, the antenna position (phase center) on the platform for each element, and the antenna polarization for each element. For Bluetooth (BLE) devices that applies antenna switching, the antenna platform information may further comprise the switching delay for each antenna element. As a result, device 102 can resolves AoD relative to the antenna platform of AP 101 based on the received signals and then determine its location based on conventional AoD algorithms such as Bartlett beamformer, MUSIC, etc. Because the simplified antenna platform format information does not include the antenna spatial signature or the antenna array response, it reduces the overhead for data transmission and storage.

Figure 2:
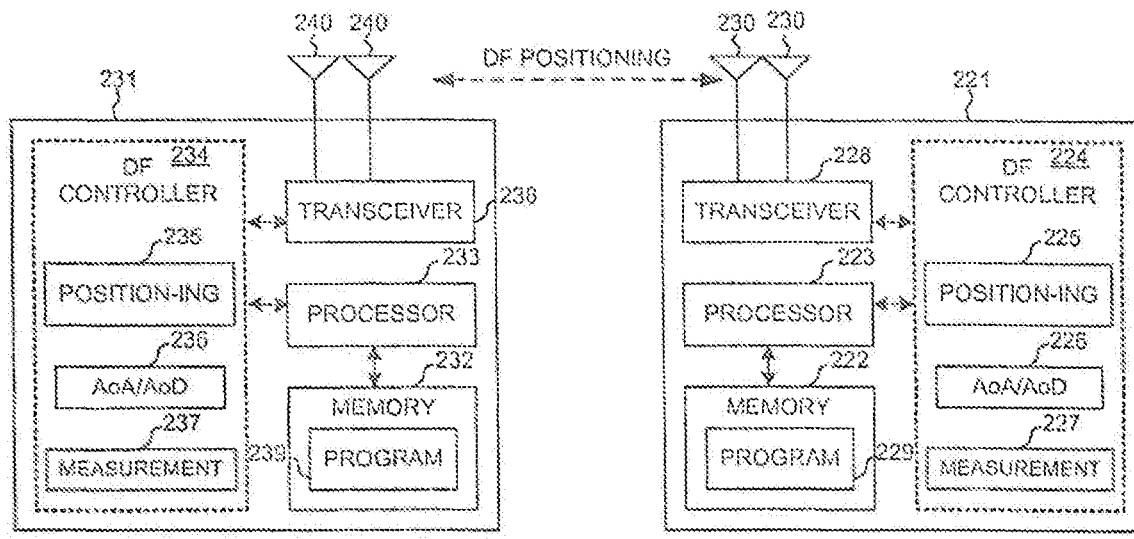
FIG. 2 is a simplified bock diagram of an initiating device and a responding device that carry out certain embodiments of the invention.

FIG. 2 is a simplified bock diagram of an initiating device 221 and a responding device 231 that carry out certain embodiment of the invention. The initiating device is referred to as an initiator, and the responding device is referred to as a responder. Both devices can be an AP station or a no-AP wireless device (Bluetooth/Wi-Fi device). Initiating device 221 comprises memory 222, a processor 223, a direction finding DF controller 224, which further comprises a positioning module 225, an AoA/AoD circuit 226, and a measurement module 227, and a transceiver 228 coupled to multiple antennas 230. Similarly, responding device 231 comprises memory 232, a processor 233, a DF controller 234, which further comprises a positioning module 235, an AoA/AoD circuit 236, a measurement module 237, and a transceiver 238 coupled to multiple antennas 240.

In the transmitting direction, the transceiver converts the baseband signals from the processor to RF signals and sends out to the antennas. In the receiving direction, the processor processes the received baseband signals from the transceiver and invoke different functional modules to perform various features and embodiments supported by the wireless devices. The different modules are functional circuits that can be implemented and configured in software, firmware, hardware, and any combination thereof. The function modules, when executed by processors 223 and 233 (via program instructions 229 and 239 contained in memory 222 and 232), interwork with each other to allow the wireless devices to perform AoA/AoD positioning. For example, the measurement module performs timing measurements of RF radio signals, the AoD/AoA circuit estimates AoD/AoA solution, the positioning module determines the location of the wireless device based on the AoD/AoA estimations, and the DF controller configures AoD/AoA related parameters and controls the different modules for corresponding direction finding procedures.

Figure 3:
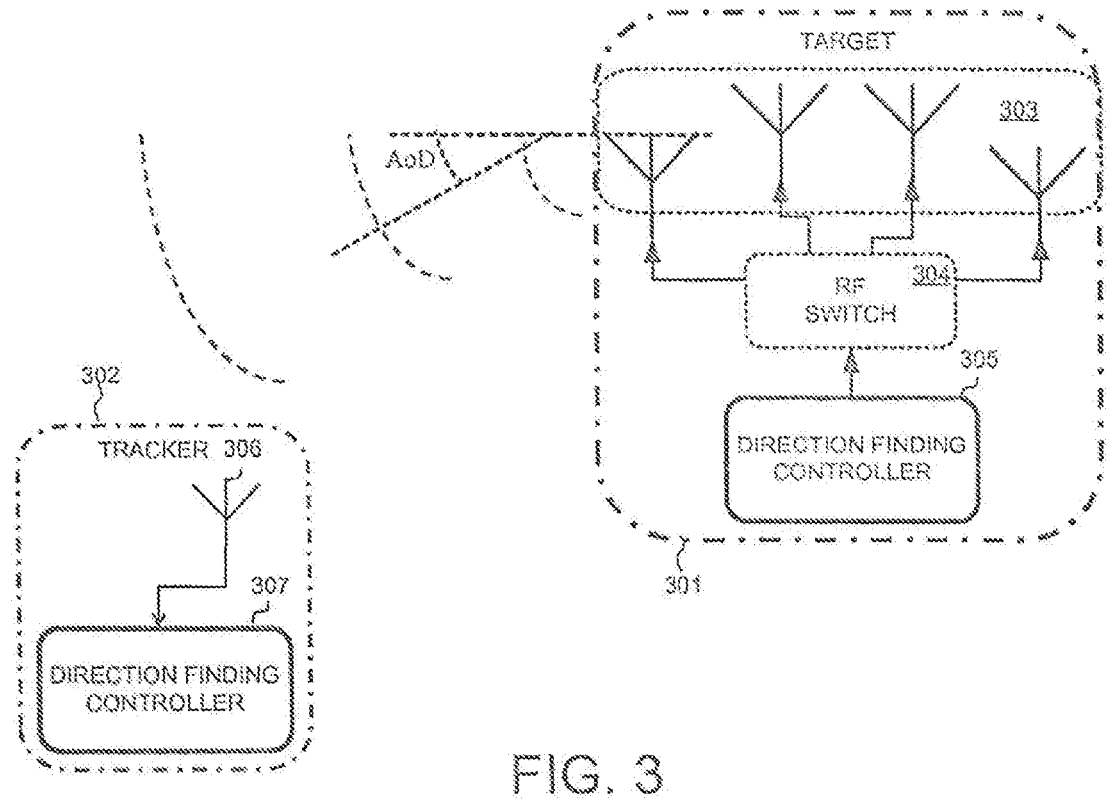
FIG. 3 illustrates direction finding based on angle of departure (AoD) estimation.

FIG. 3 illustrates direction finding based on angle of departure (AoD) estimation. AoD measurement is a method for determining the direction of propagation of a radio signal on a switched antenna array. In the example of FIG. 3, multiple antenna elements on an antenna platform 303 of target 301 are used to estimate the AoD based on the phase difference observed by tracker 302 from signals transmitted from the multiple antenna elements of target 301. Target 301 has an antenna array 303, an RF switch 304 (for Bluetooth only), and a direction-finding controller 305. Tracker 302 has a single antenna 306 and a direction-fining controller 307. Assuming that the timing delay through each antenna are calibrated, the timing delay of the radio signal from each individual antenna elements of the target to the tracker can be measured based on distance, and the AoD can be calculated accordingly.

In one embodiment, target 301 transmits a packet containing AoD training signal. The packet contains a known section (AoD field) during which the target is executing antenna switching to sequence through antenna elements in pre-determined timing. Tracker 302 receives the AoD training signal and executing I&O sample capturing during reception of the AoD field. The direction-finding controller 307 of the tracker uses the captured I&O samples and antenna array information to calculate the AoD of the packet transmitted by the target. The knowledge of AoD can be combined with the knowledge of the distance between the target and the tracker so that the tracker can determine its own location.

Figure 4:
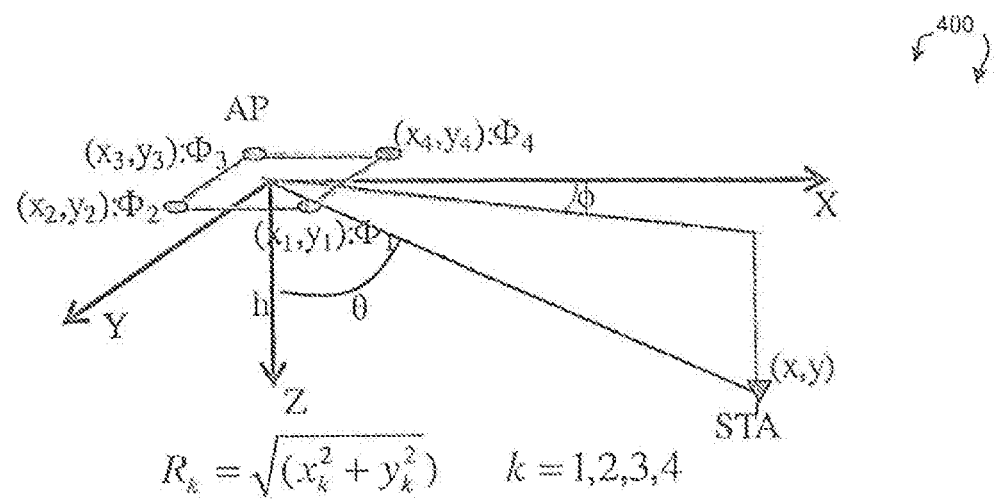
FIG. 4 illustrates AoD and positioning with additional details.

FIG. 4 illustrates one example of AoD positioning with additional details. In the example of FIG. 4, an access point (AP) is located above the floor with height h, and having four antennas have the same height as the AP, while a wireless station (STA) is located on the floor. The four AP antennas are indexed by (k=1, 2, 3, 4), and each antenna had its location corresponding to $(x_k, y_k)$ or $(R_k, \phi_k)$, where $(x_k, y_k)$ indicates the X-Y plane coordinates of each antenna, $R_k$ indicates the distance to the X-Y plane origin and $\phi_k$ indicates the angle from X-axis of each antenna. The STA location can be represented by its X-Y plane coordinates (h, x, y) or (r, θ, φ, ), where r indicates the STA distance to the AP, θ is, the STA angle to Z-axis, and φ is the STA angle from X-axis.

The AP transmits radio signals to the STA via four antennas, and the STA estimates the AoD from the received signals transmitted from the four antennas of the AP. The STA received signals $r_k(t)$ transmitted from antenna k of S(t) with noise $n_k(t)$ can be represented as:

$$r_k(t) = e^{-j\frac{2\pi R_k}{\lambda}\cos(\phi-\Phi_k)\sin\theta} \cdot s(t) + n_k(t)$$

and:
h=r*cos(θ)
x=r*sin(θ)*cos(φ)
y=r*sin(θ)*sin(φ)

As a result, the STA location (x, y) can be solved using θ and φ if the AP antenna locations, antenna platform orientation, and the height h (relative to the floor) are known. Algorithms such as Bartlett Beamformer or MUSIC algorithm can be used to solve AoD based on the relative signal phase from different antennas.

Figure 5:
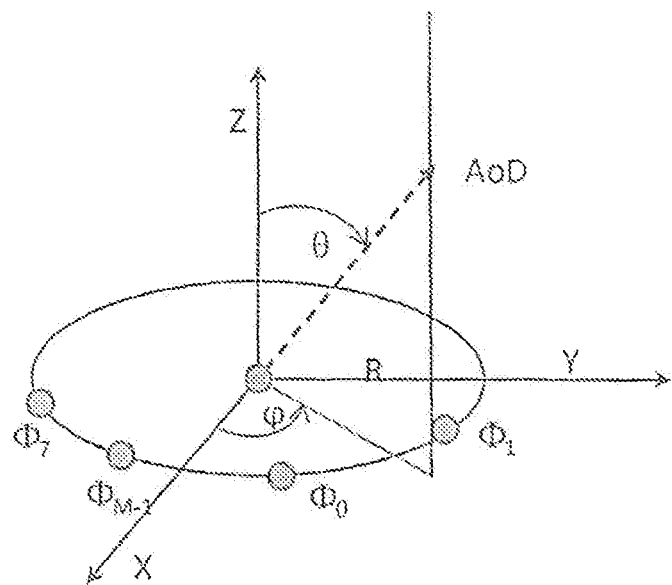
FIG. 5 illustrates a generic signal model and an antenna platform.

FIG. 5 illustrates a generic signal model and an antenna platform. In general, the signal propagation from the k-th antenna to receiver can be represented as the following (for LOS situation):

$$r_k(t) = e^{-j2\pi f_c \tau_k} G_k l_k \gamma_k s(t-\tau_k) + n_k(t)$$

where $\tau_k$ is the delay, $G_k$ is the antenna gain, $l_k$ is the space loss and $\gamma_k$ is the coupling of antenna polarization
$l_k$=1 for all k $$s(t-\tau_k) \approx s(t)$$

For the antenna platform as shown in FIG. 5, the received signal can be expressed as:

$$\tau_k = \frac{R\cos(\phi-\Phi_k)\sin\theta}{c}$$

$$r_k(t) = lG_k\gamma_k e^{-j\frac{2\pi R}{\lambda}\cos(\phi-\Phi_k)\sin\theta} \cdot s(t) + n_k(t)$$

k = 0, 1, ... , M − 1 where the space loss is the same for all elements $$\underline{r} = \begin{bmatrix} r_0 \\ r_1 \\ \vdots \\ r_{M-1} \end{bmatrix} = \begin{bmatrix} a_0 \\ a_1 \\ \vdots \\ a_{M-1} \end{bmatrix} s + \begin{bmatrix} n_0 \\ n_1 \\ \vdots \\ n_{M-1} \end{bmatrix} = \underline{a}(\phi,\theta)s + \underline{n}$$

where $a_k = lG_k\gamma_k e^{-j\frac{2\pi R}{\lambda}\cos(\phi-\Phi_k)\sin\theta}$ The receiver needs to perform polarization alignment based on the polarization types of the transmitting antenna and the receiving antenna. For two linear, polarizations:

$$\gamma_i = |\underline{i_k} \cdot \underline{i}|$$

where $\underline{i_k}$ is the unit vector in the direction of polarization and $\underline{i}$ is the unit vector of the antenna polarization direction of receiving device For one linear polarization and one circular polarization:

$$\gamma_k = \frac{1}{\sqrt{2}}\|\underline{i_k} \times \underline{i}\|$$

where $\underline{i_k}$ the unit vector in the direction of polarization and $\underline{i}$ is the unit vector of the antenna polarization direction of receiving device For two circular polarizations:

$$\gamma_k = \sqrt{\frac{1+\rho_k^2\rho^2 + 2\rho_k\rho \cdot (2|\underline{i_k}\cdot\underline{i}|^2 - 1)}{(1+\rho_k^2)(1+\rho^2)}}$$

where $\underline{i_k}$ is the unit vector in the direction of polarization and $\underline{i}$ is the unit vector of the antenna polarization direction of receiving device, $\rho_k=(r_4+1)(r_k-1)$ is the circular polarization ratio of transmit antenna, $\rho_k=(r+1)(r-1)$ is the circular polarization ratio of receive antenna, and $r_k$ is the axial ratio of the transmit antenna, and r is the axial ratio of the receive antenna. $r_k$ and r are both not in dB.

The receiver can perform the DF algorithm (Barlett beamformer) as follows:

$$X = \begin{bmatrix} r_{0,1} & r_{0,2} & \cdots & r_{0,n} \\ r_{1,1} & r_{1,2} & \cdots & r_{1,n} \\ \vdots & \vdots & & \vdots \\ \vdots & \vdots & \cdots & \vdots \\ \vdots & \vdots & & \vdots \\ r_{M-1,1} & r_{M-1,2} & \cdots & r_{M-1,n} \end{bmatrix}_{M\times n}$$

$$R_x = \frac{1}{n}XX^H$$

$$\phi, \theta = \max_{\phi,\theta,i} \frac{\underline{a}^H R_x \underline{a}}{\|\underline{a}\|^2}$$

where $\underline{i}$ is all possible polarization directions of receiving device Based on the above equation, the receiver is able to estimate the AoD solution θ and φ with respect to the antenna platform of the transmitter. (Note, $r_{k,i}$ denotes the k-th antenna i-th sample from M×n samples) Therefore, as long as the receiver knows the number of antenna elements, the phase center of each antenna element (($x_k$, $y_k$), or ($R_k$, $\Phi_k$)), and the polarization type and polarization of each antenna element for calculating the coupling of antenna polarization, then the receiver will be able to estimate the AoD solution θ and φ with respect to the antenna platform of the transmitter. Furthermore, if the receiver also knows the antenna position and the antenna platform orientation, then the receiver can determines its own position accordingly.

Figure 6:
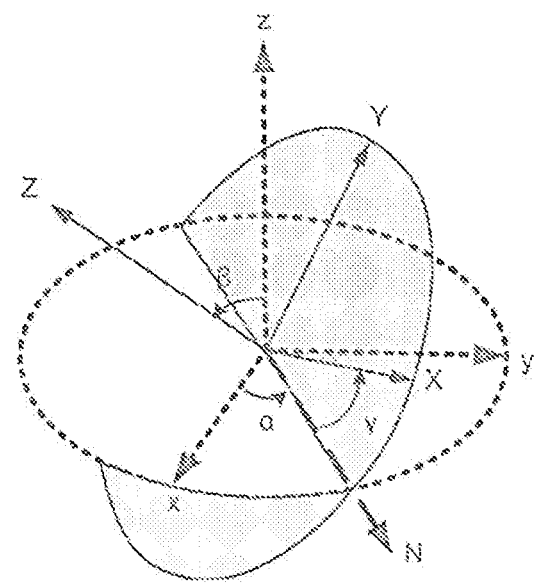
FIG. 6 illustrates an antenna platform specified in Euler Angles.

FIG. 6 illustrates an antenna platform specified in Euler Angles. In the example of FIG. 6, the xyz (original) system is shown in dotted lines. The antenna platform XYZ (rotated) system is shown in solid lines. The line of nodes (N) is shown in a dashed line. α is the angle between the x axis and the N axis, β represents a rotation around the N axis, and γ is the angle between the N axis and the X axis. The antenna platform orientation information helps the receiver to convert its coordinates from the rotated antenna platform system to the original coordinating system.

In a switched antenna implementation, a multiple antenna BLE device transmits through different antennas at different time slots. The receiver then estimates the relative signal phases of antennas at different time slots to compute the AoD. Different switch "propagation" delays affect the phase measurements from different antennas. Therefore, the receiver will be able to measure the signal phase more accurately if the transmitter provides the switch delays for each antenna.

Figure 7:
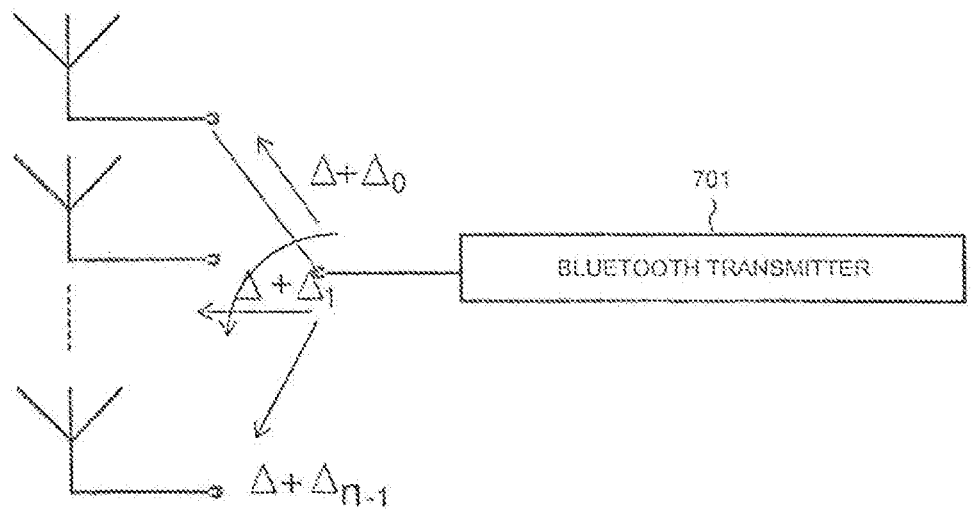
FIG. 7 illustrates a Bluetooth (BLE) transmitter having multiple antennas and corresponding switch propagation delays.

FIG. 7 illustrates a Bluetooth (BLE) transmitter having multiple antennas and corresponding switch propagation delays. In the example of FIG. 7, a Bluetooth BLE transmitter 701 has multiple antennas. BLE 701 transmits radio signals through different antennas at different time slots. Each antenna has a different switch propagation delay. For each antenna k=0, 1 ... n−1, the nominal delay $\Delta$ is selected such that $\Delta_k \geq 0$, while $\Delta_k$ can be represented by an eight or twelve bit number. For example, LSB=0.03 ns (8 bit) or 0.001875 ns (12 bit), and max delay error is equal to 0.768 ns.

Figure 8:
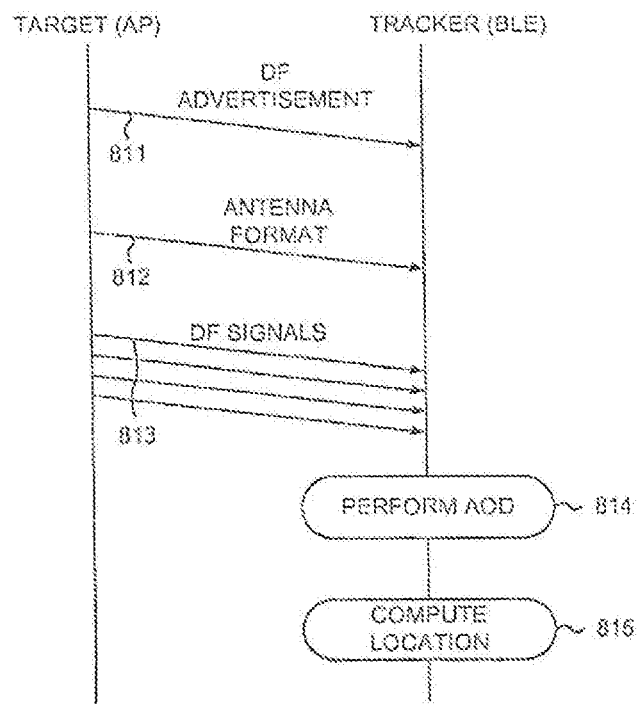
FIG. 8 illustrates a procedure of direction finding (DF) positioning for Bluetooth based on AoD using a simplified antenna platform format.

FIG. 8 illustrates a procedure of direction finding positioning for Bluetooth based on AoD. In this example, a Bluetooth AP 801 is a target for transmitting AoD training signals and a Bluetooth device BLE 802 is a tracker for receiving the AoD training signals and performing AoD algorithm. In a switched antenna implementation, a multiple antenna AP transmits through different antennas at different time slots. The receiver then estimates the relative signal phases of antennas at different time slots to compute the AoD. In step 811, AP 801 transmits a DF advertisement indicating the subsequent transmission for AP antenna platform format information and DF sounding signals. In step 812, AP 801 transmits the AP antenna platform format information to BLE 802. The antenna platform format information comprises a format indicator, antenna platform position and orientation information, a number of antenna elements, and switching delay, phase center, and polarization information for each antenna element. In step 813, AP 801 transmits AoD training signals using switched antenna implementation, and the AoD training signals are transmitted through different antennas at different time slots. In step 814, BLE 802 receives the AoD training signals and performs AoD algorithm to estimate the AoD solution ($\phi$ and $\theta$) using the received AP antenna platform format information. Finally, in step 815, BLE 802 computes its absolute location based on the estimated AoD solution and the AP antenna platform position and orientation information.

FIG. 9 illustrates one embodiment of providing simplified antenna platform format information for AoD positioning. In general, the simplified antenna platform format information comprises an antenna platform format indicator, antenna platform position and orientation information, a number of antenna elements, and switching delay, phase center, and polarization information for each antenna element. Table 901 shows an antenna platform format indicator having a size of one bit. The value of 0x0 indicates a default antenna platform format, which contains antenna array response for different directions. The value of 0x1 indicates a simplified antenna platform format, which is described below.

Table 902 shows the antenna platform position and orientation information. The antenna platform position occupies 3 octets, indicating the location of the antenna platform with respect to the local antenna platform coordinating system. The antenna platform orientation occupies 3 octets, indicating the relationship between the original coordinating system and the local antenna platform coordinating system.

Table 903 shows the switching delay of each antenna element for BLE transmitting device that applies switched antenna implementation. Each switch delay field has one octet, the value indicating the switch propagation delay difference of each antenna element with 0.03 ns accuracy.

Table 904 shows the antenna position, e.g. the phase center of each antenna element. Each phase center field has three octets, the value of each octet indicating the X, Y, and Z coordinate of antenna position in local antenna platform coordinate system, in mm.

Table 905 shows the antenna polarization type of each antenna element. Each antenna polarization type has a size of two bits. The value of 0x00 indicates linear polarization, the value of 0x01 indicates circular polarization, the value of 0x10 indicates mixed polarization, and the value of 0x11 is reserved. Table 906 shows the antenna polarization orientation of each antenna element. Each polarization orientation filed has three octets, the value of each octet indicating the 3D orientation of the antenna in local antenna platform coordinate system, namely alpha, beta, and gamma, respectively.

Figure 10:
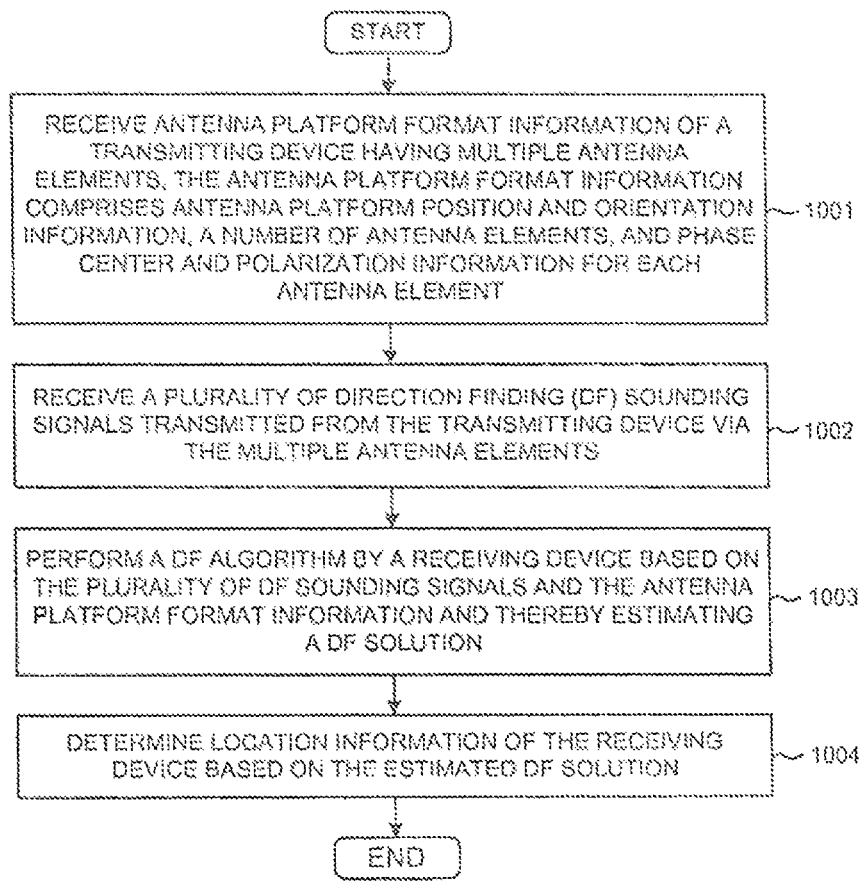
FIG. 10 is a flow chart of the method of performing direction finding (DF) positioning with a simplified antenna platform format in accordance with one novel aspect.

FIG. 10 is a flow chart of the method of performing DF positioning with a simplified antenna platform format in accordance with one novel aspect. In step 1001, a receiving device receives antenna platform format information of a transmitting device having multiple antenna elements. The antenna platform format information comprises an antenna platform format indicator, antenna platform position and orientation information, a number of antenna elements, and switching delay, phase center, and polarization information for each antenna element. In step 1002, the receiving device receives a plurality of direction finding sounding signals transmitted from the transmitting device via the multiple antenna elements. In step 1003, the receiving device performs a DF algorithm based on the plurality of DF sounding signals and the antenna platform format information and thereby estimating a DF solution. In step 1004, the receiving device determines its own location information based on the estimated DF solution. Because the simplified antenna platform format information does not include the antenna spatial signature or the antenna array response, it reduces the overhead for data transmission and storage for the DF positioning method.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    receiving antenna platform format information of a transmitting device having multiple antenna elements, wherein the antenna platform format information comprises antenna platform position and orientation information, a number of antenna elements, and phase center for each antenna element, wherein the antenna platform format information further comprises an antenna platform format indicator indicating a simplified antenna platform format;
    receiving a plurality of direction finding (DF) radio signals transmit ted from the transmitting device via the multiple antenna elements;
    estimating a DF solution by performing a DP algorithm by a receiving wireless local area network (WLAN) device based on the plurality of DF radio signals and the antenna platform format information to produce an estimated DF solution; and
    determining location information based on the estimated DF solution.

2. The method of claim 1, wherein the plurality of DF radio signals are transmitted via the multiple antenna elements of the transmitting device, and wherein the DF algorithm is Angle of Departure (AoD).

3. The method of claim 1, wherein the transmitting device is a WLAN device applying antenna switching for the DF radio signals.

4. The method of claim 3 further comprising the receiving device receiving switching delay information from the transmitting device.

5. The method of claim 1, wherein the phase center information for each antenna element is represented by one to two octets for each coordinate.

6. The method of claim 1, wherein the antenna platform format information further comprises polarization information.

7. The method of claim 6, wherein the polarization information for each antenna element comprises polarization type information and polarization orientation information, and wherein the polarization type information indicates a linear polarization type or a circular polarization type for each antenna element.

8. The method of claim 7, wherein the polarization type information and the polarization orientation information for each antenna element are the same.

9. The method of claim 1, wherein the antenna platform format information does not contain antenna array response for different directions under the simplified antenna platform format.

10. The method of claim 1, wherein the estimating a DF solution comprises the receiving device applying Barlett beamformer or MUSIC algorithm to estimate the OF solution.

11. A wireless local area network (WLAN) device, comprising:
   a radiofrequency (RF) receiver operable to receive antenna platform format information of a transmitting device having multiple antenna elements, wherein the antenna platform format information comprises antenna platform position and orientation information, a number of antenna elements, and phase center for each antenna element, and wherein the receiver is also operable to receive a plurality of direction finding (DF) radio signals transmitted from the transmitting device via the multiple antenna elements, wherein the antenna platform format information further comprises an antenna platform format indicator indicating a simplified antenna platform format; and
   a DF controller operable to estimate a DF solution by performing a DF algorithm based on the plurality of DF radio signals and the antenna platform format information to produce an estimated DF solution, wherein the DF controller also is operable to determine location information of the device based on the estimated DF solution.

12. The device of claim 11, wherein the plurality of DF radio signals are transmitted via the multiple antenna elements of the transmitting device, and wherein the DF algorithm is Angle of Departure (AoD).

13. The device of claim 11, wherein the transmitting device is a WLAN device applying antenna switching for the DF radio signals.

14. The device of claim 13, wherein the receiving device is also operable to receive switching delay information from the transmitting device.

15. The device of claim 11, wherein the phase center information for each antenna element is represented by one to two octets for each coordinate.

16. The device of claim 11, wherein the antenna platform format information further comprises polarization information.

17. The device of claim 16, wherein the polarization information for each antenna element comprises polarization type information and polarization orientation information, and wherein the polarization type information indicates a linear polarization type or a circular polarization type for each antenna element.

18. The device of claim 17, wherein the polarization type information and the polarization orientation information for each antenna element are the same.

19. The device of claim 11, wherein the antenna platform format information does not contain antenna array response for different directions under the simplified antenna platform format.

20. The device of claim 11, wherein the receiving device is operable to apply
   Barlett beamformer or MUSIC algorithm to estimate the DF solution.

* * * * *